(12) United States Patent
Sherman et al.

(10) Patent No.: US 10,647,071 B2
(45) Date of Patent: May 12, 2020

(54) HIGH-ENERGY DENSITY NANOCOMPOSITE CAPACITOR

(71) Applicant: Powdermet, Inc., Euclid, OH (US)

(72) Inventors: Andrew Sherman, Mentor, OH (US); Haixong Tang, Euclid, OH (US); Brian Doud, Cleveland Heights, OH (US)

(73) Assignee: Powdermet Inc., Euclid, OH (US)

( * ) Notice: Subject to any disclaimer, the term of this patent is extended or adjusted under 35 U.S.C. 154(b) by 268 days.

(21) Appl. No.: 15/294,936

(22) Filed: Oct. 17, 2016

(65) Prior Publication Data

US 2017/0301466 A1    Oct. 19, 2017

Related U.S. Application Data

(60) Provisional application No. 62/243,394, filed on Oct. 19, 2015.

(51) Int. Cl.
| | |
|---|---|
| B29C 70/60 | (2006.01) |
| H01M 4/04 | (2006.01) |
| H01B 1/12 | (2006.01) |
| H01M 4/64 | (2006.01) |
| H01G 4/20 | (2006.01) |
| H01G 4/18 | (2006.01) |
| B29C 70/88 | (2006.01) |
| B29C 39/00 | (2006.01) |
| B29C 39/02 | (2006.01) |
| B29C 55/04 | (2006.01) |

(Continued)

(52) U.S. Cl.
CPC ............ *B29C 70/60* (2013.01); *B29C 39/003* (2013.01); *B29C 39/02* (2013.01); *B29C 55/04* (2013.01); *B29C 55/12* (2013.01); *B29C 70/882* (2013.01); *H01B 1/12* (2013.01); *H01G 4/1227* (2013.01); *H01G 4/18* (2013.01); *H01G 4/186* (2013.01); *H01G 4/206* (2013.01); *H01M 4/04* (2013.01); *H01M 4/64* (2013.01); *B29K 2105/162* (2013.01); *B29K 2509/02* (2013.01); *B29K 2995/0006* (2013.01); *B29L 2031/34* (2013.01); *H01G 4/306* (2013.01); *H01G 4/32* (2013.01); *H01G 4/33* (2013.01)

(58) Field of Classification Search
CPC .................................................. H01G 4/1227
See application file for complete search history.

(56) References Cited

U.S. PATENT DOCUMENTS

| | | | |
|---|---|---|---|
| 4,086,649 | A | 4/1978 | Hanold |
| 5,700,548 | A | 12/1997 | Warnier et al. |

(Continued)

FOREIGN PATENT DOCUMENTS

| | | |
|---|---|---|
| CN | 104893187 | 9/2015 |
| WO | 2014182245 | 11/2014 |
| WO | 2015006030 | 1/2015 |

OTHER PUBLICATIONS

Li et al., "Dielectric properties of binary polyvinylidene fluoride/barium titanate nancomposites and their nanographic doped hybrids"; Polymer Letters, vol. 5, issue 6; pp. 526-534 (2011).

(Continued)

*Primary Examiner* — Benjamin A Schiffman
(74) *Attorney, Agent, or Firm* — Fay Sharpe LLP

(57) ABSTRACT

A composite film having a high dielectric permittivity engineered particles dispersed in a high breakdown strength polymer material to achieve high energy density.

49 Claims, 3 Drawing Sheets

(51) Int. Cl.
  *B29C 55/12*   (2006.01)
  *H01G 4/12*    (2006.01)
  H01G 4/32     (2006.01)
  H01G 4/30     (2006.01)
  B29K 105/16   (2006.01)
  B29K 509/02   (2006.01)
  B29L 31/34    (2006.01)
  H01G 4/33     (2006.01)

(56) References Cited

U.S. PATENT DOCUMENTS

| | | |
|---|---|---|
| 2004/0071944 A1 | 4/2004 | Weir et al. |
| 2006/0167139 A1 | 7/2006 | Nelson et al. |
| 2010/0160994 A1 | 6/2010 | Feldman et al. |
| 2010/0209779 A1 | 8/2010 | Wendman |
| 2011/0212382 A1 | 9/2011 | Randall et al. |
| 2012/0295448 A1 | 11/2012 | Miller |

OTHER PUBLICATIONS

Liu et al., "Improving the dielectric constant and energy density of poly(vinylidene fluoride) composites induced by surface-modified $SrTiO_3$ nanofibers by polyvinylpyrrolidone" Journal of Materials Chemistry; vol. 3, issue 4, pp. 1511-1517 (2015).

US Searching Authority, International Search Report and Written Report issued to related PCT/US2016/057276 (Jun. 2017).

HIGH-ENERGY DENSITY NANOCOMPOSITE CAPACITOR

The present invention claims priority on U.S. Provisional Patent Application Ser. No. 62/243,394 filed Oct. 19, 2015, which is incorporated herein by reference.

This invention was made with U.S. government support under Contract No. W15QKN-13-C-0070 awarded by Department of Defense Small Business Innovation Research (SBIR). The U.S. government has certain rights in the invention.

The invention relates in general to high energy density nanocomposite capacitors that include nanoceramic filler in a polymer material. More particularly, the invention relates to a nanocomposite having a high dielectric permittivity nanoengineered particles dispersed into a high breakdown strength polymer material to achieve high energy density. The ceramic fillers are designed as core-shell structure, followed by coating the second layer of functional groups, to achieve a good dispersion in the polymer material and without causing a signification reduction in breakdown strength, leading to high-energy density.

BACKGROUND OF THE INVENTION

High-energy density capacitors play a critical role in numerous military and commercial pulsed power applications; however, the current state-of-the-art technology suffers from low-energy density, making them bulky and costly. Deployment of current and future pulse power devices such as radar devices, lasers, rail guns, high-power microwaves, defibrillators and pacemakers, will continue to rely on the development of high-energy density capacitors.

Current pulse power devices often use polymer film capacitors, which include biaxially oriented polypropylene (BOPP), polyethylene terephthalate (PET), polystyrene (PS), polycarbonate (PC) and polyimide (PI), all of which have the advantage of high dielectric breakdown strength. However, all the mentioned polymers have low dielectric permittivity (2-3.2), which highly limits the energy density of the capacitor. For example, the current state-of-the-art active film material for capacitors is BOPP, which offers a capacitor energy density of 1.2 J/cc, but is restricted by its low dielectric permittivity, thus limiting the size and cost of these systems.

The current challenge of pulse power devices is obtaining high energy density. Theoretically, the energy density is linearly proportional to the dielectric constant and quadratically related to the breakdown strength of the capacitor. Therefore, many efforts have been devoted to enhance the material's permittivity and/or breakdown strength to improve the energy density. Currently, commercial monolithic materials are reaching a plateau in terms of energy density, due to the trade-off between the dielectric permittivity and breakdown strength of the materials. Nanocomposites combining a high breakdown strength polymer and a high dielectric permittivity ceramic filler offer significant promise for future high-energy density capacitors. While current nanocomposites improve the dielectric permittivity of the capacitor, the gains come at the expense of the breakdown strength, which limits the ultimate performance of the capacitor. Therefore, there is an increased demand to capture high dielectric permittivity from ceramic and high breakdown strength from polymer to achieve high energy density.

BRIEF SUMMARY OF THE INVENTION

The present invention relates in general to high-energy density nanocomposite capacitors that include nanoceramic filler in a polymer material. The invention also relates to a nanocomposite having a high dielectric permittivity nano-engineered particle dispersed in a high breakdown strength polymer material to achieve high-energy density. The present invention addresses these needs by creating a gradient interface between the fillers and material to attain a high permittivity while maintaining a high breakdown strength leading to high-energy density. One non-limiting application of the invention is for use in pulse power devices, such as radar devices, lasers, rail guns, high-power microwave devices, defibrillators, and pacemakers; however, the invention can be used in other devices or components such as inverters, converters, motors, DC bus capacitors, high-power lighting and others.

In one non-limiting aspect of the invention, the invention is directed to a novel method to prepare ceramic fillers that are calcined or include components that are calcines at different temperatures to adjust their structure and particle size. By incorporating the ceramic fillers with different structure and particle size into a polymer, the energy storage performance of the composite can be tuned. High dielectric permittivity nano-ceramic fillers can then be coated into a thin layer of insulator films into a core-shell structure to increase breakdown strength. Furthermore, the invention relates to the coating of the core-shell structure particle with a second layer of functional groups to create a gradient interface. This engineering process makes the nanoparticles well dispersed into a high breakdown strength polymer material providing an improved breakdown strength in the nanocomposite. The composites can optionally be formed as a solution casting of polymer solution into nanocomposite films. The whole process can optionally be formed as a pilot scale to produce nanocomposite films. The nanocomposite films can optionally be fabricated into capacitors using common industry methods and equipment. The invention also relates to the use of the nanocomposite capacitor acting as a key energy source and component for pulse power devices and energy storage devices, such as, but not limited to, radar devices, lasers, rail guns, high-power microwaves, defibrillators and pacemaker deployment; however, the invention can be used in other devices or components such as inverters, converters, motors, DC bus capacitors, high power lighting and others.

In another non-limiting aspect of the invention, there is provided a new and improved nanoceramic powder for high-energy density nanocomposite capacitor fabrication. The novel nanoceramic powder can be doped and calcined at different temperatures to achieve high dielectric permittivity nanocomposites. This invention also is directed to a calcining process to achieve the goal of high energy density nanocomposite capacitors. By incorporating the ceramic fillers (calcined at different temperature) into the polymer, the energy storage performance of the composite can be adjusted.

In still another non-limiting aspect of the invention, there is provided a method for engineering nanoparticles to create a gradient interface between the filler and the polymer material to increase breakdown strength of the nanocomposite. The functionalized nanoparticles are generally well dispersed in the polymer material. One non-limiting fabrication method in accordance with the present invention includes the steps of 1) coating a thin layer of high dielectric strength material on the ceramic with core-shell structure, and 2) modifying the core-shell structure particle with functional groups. This hierarchical structure creates a gradient interface between the particle and polymer material, improves the dispersion of the particles, and improves breakdown strength of the nanocomposites.

In yet another non-limiting aspect of this invention, there is provided a combined high dielectric permittivity filler and gradient interface. As used herein, 'high-energy density capacitor' generally means greater than about 3 J/cc. Such high-energy density nanocomposite capacitors can be used for pulse power devices, such as rail guns, lasers, radar devices, defibrillators and pacemaker deployment; however, the invention can be used in other devices or components such as inverters, converters, motors, DC bus capacitors, high-power lighting and others.

In summary, the present invention is composite film, a method for forming a composite film, and devices or components that include the composite film. The composite film includes a polymer material that includes a plurality of particles of high dielectric permittivity ceramic filler. The high dielectric permittivity ceramic filler has a core-shell structure. The core of the core-shell structure has a different composition than the shell of the core-shell structure. The outer surface of the particles of the high dielectric permittivity ceramic filler is modified with one or more functional groups. The composite film can be formed by 1) forming a plurality of particles of high dielectric permittivity ceramic filler, wherein the high dielectric permittivity ceramic filler has a core-shell structure, and a core of said core-shell structure has a different composition than a shell of said core-shell structure; 2) modifying an outer surface of the plurality of particles of the high dielectric permittivity ceramic filler with one or more functional groups; dispersing a plurality of the modified particles of the high dielectric permittivity ceramic filler into a polymer material; and 3) solution casting the polymer material having the plurality of the modified particles of the high dielectric permittivity ceramic filler into a film to form the composite film. In one non-limiting embodiment, the polymer material can optionally include polar groups. In another and/or alternative non-limiting embodiment, the shell is formed of a dielectric material that has at least three times (e.g., 3-1000 times and all values and ranges therebetween) the breakdown strength of the material used to form the core. In another and/or alternative non-limiting embodiment, the high dielectric permittivity ceramic filler has a particle size of less than 1 micron, generally, has a particle size of about 10 nanometer to less than about 1 μm (and all values and ranges therebetween), more typically has a particle size of about 10-500 nanometers, still more typically has a particle size of about 20-450 nanometers, and even more typically has a particle size of less than about 100 nanometers. In another and/or alternative non-limiting embodiment, the shell has a coating thickness of at least about 10 Å and less than 1 μm (and all values and ranges therebetween), and typically the shell has a coating thickness of less than 100 nanometer, and more typically the shell has a coating thickness of less than 10 nanometer. In another and/or alternative non-limiting embodiment, the core of the high dielectric permittivity ceramic filler includes a high dielectric material, the shell includes a high breakdown strength material, the core is at least partially encapsulated by the shell and is typically fully encapsulated by the shell. In another and/or alternative non-limiting embodiment, the high dielectric material includes one or more materials selected from the group consisting of $BaTiO_3$, $(Pb(Zr_xTi_{1-x})O_3)$, $Pb(Mg_{1/3}Nb_{2/3})O_3$—$PbTiO_3$, $CaCu_3Ti_4O_{12}$, $TiO_2$, $BaSrTiO_3$, and $Ba_{0.8}Pb_{0.2}(Zr_{0.12}Ti_{0.88})O_3$. In another and/or alternative non-limiting embodiment, the shell includes one or more materials selected from the group consisting of $Al_2O_3$, $SiO_2$, $Si_3N_4$, MgO, aluminosilicates, mica, and diamond. In another and/or alternative non-limiting embodiment, the high dielectric material includes $BaTiO_3$ and the shell includes $Al_2O_3$ and, MgO and/or $SiO_2$. In another and/or alternative non-limiting embodiment, the thickness of the shell is less than the particle size of the core. In another and/or alternative non-limiting embodiment, the composite film has a greater dielectric constant than a dielectric constant of the polymer material and any polymer included in the polymer material that is used to form the composite film. In another and/or alternative non-limiting embodiment, the composite film has a greater breakdown strength than a breakdown strength of any of the high dielectric permittivity ceramic filler in the composite film. In another and/or alternative non-limiting embodiment, the high dielectric permittivity ceramic filler in the composite film has one or more properties selected from the group consisting of a) a plurality of different particle sizes of the high dielectric permittivity ceramic filler, b) the high dielectric permittivity ceramic filler is formed of particles that have been calcined at different temperatures, c) the high dielectric permittivity ceramic filler is formed of particles formed of different materials. In another and/or alternative non-limiting embodiment, dielectric performance, dielectric permeability, energy storage performance, and combinations thereof of the composite film is achieved by adjusting a crystal structure, a particle size, or combinations thereof of the high dielectric permittivity ceramic filler. In another and/or alternative non-limiting embodiment, the adjusting of the crystal structure, particle size, or combinations thereof of the high dielectric permittivity ceramic filler is achieved by a) calcining a plurality of the high dielectric permittivity ceramic filler at different temperatures for inclusion in the polymer material, b) incorporating different composition high dielectric permittivity ceramic filler in the polymer material, and/or c) incorporating a plurality of different particle sizes of the high dielectric permittivity ceramic filler in said polymer material. In another and/or alternative non-limiting embodiment, the polymer material includes one or more compounds selected from the group consisting of polyvinylidene fluoride (PVDF), PVDF copolymers such as trifluoroethylene (P(VDF-TrFE)), hexafluoropropylene (P(VDF-HFP)) and chlorotrifluoroethylene (P(VDF-CTFE)) as well as terpolymers such as poly(vinylidene fluoride-trifluoroethylene-chlorofluoroethylene) (P(VDF-TrFE-CFE)), polytetrafluoroethylene (PTFE), polyimide (PI), Teflon™, polyethylene naphthalate (PEN), polypropylene (PP), polycarbonate (PC), polystyrene (PS), polyphenylene sulfide (PPS), polyether ether ketone (PEEK), polyethylenimine (PEI), and polyarylsulfones (PSU). In another and/or alternative non-limiting embodiment, the one or more functional groups bonded to an outer surface of the particles of the high dielectric permittivity ceramic filler includes one or more compounds selected from the group consisting of an amine group, a hydroxyl group, a phosphonate group, a silyl group, and a carboxylic group. The thickness of the layer of the one or more function groups is at least 1 Å, typically 1 Å to 500 nm (and all values and ranges therebetween), and more typically 3 Å to 80 nm. Generally, the thickness of the layer of the one or more function groups is less than the thickness of the shell.

In another and/or alternative non-limiting embodiment, one or more of the particles of the high dielectric permittivity ceramic filler in the polymer material has a greater relative permittivity than the polymer material. In another and/or alternative non-limiting embodiment, all of the particles of the high dielectric permittivity ceramic filler in the polymer material has a greater relative permittivity than the polymer material. In another and/or alternative non-limiting embodiment, the polymer material has a greater breakdown strength than one or more of the particles of the high dielectric permittivity ceramic filler in the polymer material. In another and/or alternative non-limiting embodiment, the polymer material has a greater breakdown strength than any of the particles of the high dielectric permittivity ceramic filler in the polymer material. In another and/or alternative non-limiting embodiment, the composite film has a dielectric constant of at least about 25% a dielectric constant of any polymer in the polymer material, typically at least about 100% a dielectric constant of any polymer in the polymer material, and more typically at least about 150% a dielectric constant of any polymer in the polymer material. In another and/or alternative non-limiting embodiment, the high dielectric permittivity ceramic filler comprises about 1 vol. % to 95 vol. % of the composite film (and all values and ranges therebetween). In another and/or alternative non-limiting embodiment, the high dielectric permittivity ceramic filler comprises about 5-25 vol. % of the composite film. The amount of high dielectric permittivity ceramic filler included in the composite film is generally selected so the high dielectric permittivity ceramic filler is below that percolation threshold of the composite film. In another and/or alternative non-limiting embodiment, the high dielectric permittivity ceramic filler is calcined at a temperature of about 800° C. to about 1300° C. (and all values and ranges therebetween). In another and/or alternative non-limiting embodiment, the calcined high dielectric permittivity ceramic filler is post-heat treated. In another and/or alternative non-limiting embodiment, the post-heat treating includes one or more processes selected from the group consisting of quench in water, quench in ice water, quench in liquid nitrogen, and heat above melting point. In another and/or alternative non-limiting embodiment, the post heat treating of the calcined high dielectric permittivity ceramic filler is used to improve breakdown strength of the high dielectric permittivity ceramic filler and/or achieve higher energy density of the high dielectric permittivity ceramic filler. In another and/or alternative non-limiting embodiment, the stretching or aligning of the composite film is used to achieve higher energy density of the composite film. In another and/or alternative non-limiting embodiment, the process of stretching or aligning includes one or more processes selected from the group consisting of uniaxial stretching and biaxial stretching. In another and/or alternative non-limiting embodiment, a thickness of the composite film is at least about 1 μm. In another and/or alternative non-limiting embodiment, the thickness of the composite film is about 1 μm to 1 mm (and all values and ranges therebetween). In another and/or alternative non-limiting embodiment, the composite film is included in a device or component selected from the group consisting of power pulse devices, energy storage devices, inverters, converters, motors, DC bus capacitors, and high-power lighting. In another and/or alternative non-limiting embodiment, the composite film is included in a device or component selected from the group consisting of radar devices, lasers, rail guns, high-power microwave devices, defibrillators, and pacemakers. In another and/or alternative non-limiting embodiment, there are provided power pulse devices, energy storage devices, inverters, converters, motors, DC bus capacitors, or high-power lighting that includes a composite film of the present invention. In another and/or alternative non-limiting embodiment, the high dielectric permittivity ceramic filler has a dielectric constant in bulk form of over 10,000 from a temperature range of room temperature (e.g., 20° C.–22° C.) to 100° C. In another and/or alternative non-limiting embodiment, the high dielectric permittivity ceramic filler has a broad curie point range (e.g., a temperature range of at least about 10° C., and typically at least about 20° C.–200° C.). In another and/or alternative non-limiting embodiment, the composite film has a film energy storage density that exceeds 10 J/cc, and typically exceeds 20 J/cc.

In one non-limiting object of the present invention, there is provided improved nanocomposite films.

In another and/or alternative non-limiting object of the present invention, there is the provision of a device for storing, and/or controlling, and/or manipulating a charge and/or electrical energy having a nanocomposite film as a dielectric layer.

In another and/or alternative non-limiting object of the present invention, there is the provision of a method to fabricate nanocomposite films by incorporating a core-shell structure with high dielectric permittivity nanoparticle into a high breakdown strength polymer material to create a gradient interface to improve breakdown strength, leading to high energy density.

In another and/or alternative non-limiting object of the present invention, there is the provision of a method to optimize the dielectric performance of the nanocomposite film by adjusting the crystal structure of the filler, which method optionally includes doping a different element in the materials at different temperature; and/or which method optionally includes incorporating different structures of fillers in the polymer material, the dielectric permittivity of the materials can be tuned as well as the energy storage performance.

In another and/or alternative non-limiting object of the present invention, there is the provision of a dielectric layer that is a thin film or thick film.

In another and/or alternative non-limiting object of the present invention, there is the provision of a device or method wherein any composite film comprises high dielectric permittivity ceramic fillers as the core and high breakdown strength ceramic as the shell, and wherein the core-shell ceramics can optionally be modified with different functional group, which can optionally be bonded with polymer material.

In another and/or alternative non-limiting object of the present invention, there is the provision of a device or method wherein the shell material can increase the breakdown strength of the core.

In another and/or alternative non-limiting object of the present invention, there is the provision of a device or method wherein the functional groups bonded with the shell can improve the dispersion of the particles in the polymer as well as improve the breakdown strength of the composite materials.

In another and/or alternative non-limiting object of the present invention, there is the provision of a device or method wherein a dielectric permittivity filler (>1000) is necessary for the composite capacitor, and can optionally include one or more ferroelectric materials such as lead zirconate titanate ($Pb(Zr_xTi_{1-x})O_3$), $Pb(Mg_{1/3}Nb_{2/3})O_3$—$PbTiO_3$ (PMN-PT), $BaTiO_3$ and so on, and/or any other high dielectric materials, for example, calcium copper titanate ($CaCu_3Ti_4O_{12}$).

In another and/or alternative non-limiting object of the present invention, the nanocomposite has a dielectric constant that is larger than the value of a dielectric constant of any of the powders used to form the nanocomposite, and is typically 1.1-100 times greater (and all values and ranges therebetween) than the of value of a dielectric constant of any of the powders used to form said nanocomposite.

In another and/or alternative non-limiting object of the present invention, there is the provision of a device or method wherein the high breakdown strength shell materials include a thin layer of high breakdown strength material such as ceramic (e.g., $Al_2O_3$, $SiO_2$, etc.), mica, diamond and others.

In another and/or alternative non-limiting object of the present invention, there is the provision of a device or method wherein the thickness of the shell can range from 10 Å to 1 µm (and all values and ranges therebetween).

In another and/or alternative non-limiting object of the present invention, there is the provision of a device or method wherein the functional groups bonded with the shell can include one or more groups of amine group, hydroxyl group or others selected from phosphonate group, a silyl group, or a carboxylic group and others.

In another and/or alternative non-limiting object of the present invention, there is the provision of a device or method wherein the modified hierarchical particles are well dispersed in the polymer solution.

In another and/or alternative non-limiting object of the present invention, there is the provision of a device or method wherein the particles can be dispersed in the polymer solution.

In another and/or alternative non-limiting object of the present invention, there is the provision of a device or method wherein a high-power mixing arrangement can be used to disperse the particles in the solution, wherein such high-power mixing arrangement can include a high-power horn sonication, ultrasonic dispersion, etc.

In another and/or alternative non-limiting object of the present invention, there is the provision of a device or method wherein any quench procedure can be used to improve the breakdown strength of the nanocomposites to achieve high-energy density, such as quenching in water, quenching in ice water, and/or quenching in liquid gas (e.g., nitrogen, etc.).

In another and/or alternative non-limiting object of the present invention, there is the provision of a device or method wherein any continuous setup to fabricate nanocomposites using the method can be used.

These and other objects, features and advantages of the present invention will become apparent in light of the following detailed description of preferred embodiments thereof, as illustrated in the accompanying drawings.

DETAILED DESCRIPTION OF INVENTION

Figure 1:
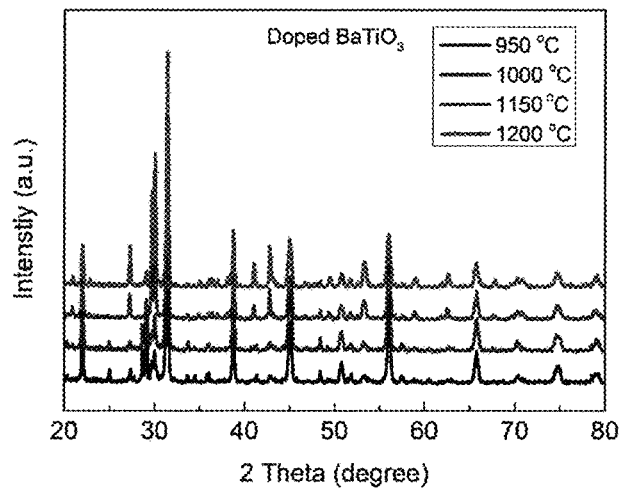
FIG. 1 illustrates the XRD patterns of doped $BaTiO_3$ calcined at different temperatures showing that the crystal structures vary with calcining temperature, wherein the top line is at the temperature 1200° C., the second line is at the temperature 1150° C., the third line is at the temperature 1000° C., and the fourth and bottom line is at the temperature 950° C.

The present invention relates in general to high-energy density nanocomposite capacitors that include nanoceramic filler in a polymer material. The invention also relates to a nanocomposite having a high dielectric permittivity nano-engineered particle dispersed into a high breakdown strength polymer material to achieve high-energy density. The invention also related to nanocomposite films and a method for making such films. The nanocomposite films are formed in the following process: 1) create high dielectric permittivity ceramic fillers with core-shell structure and 2) modify the surface with functional groups. The resulted engineered nanoparticles are dispersed into the polymer material; the mixture is then solution cast into the thin nanocomposite films.

The dielectric permittivity of the nanocomposite can be improved by incorporating high dielectric permittivity fillers into a polymer material. The invention is directed to a method to prepare doped nanoceramic fillers calcined at different temperatures to tune the dielectric properties of the nanocomposites. The novel fabrication method is generally comprised of the steps of 1) ball mill the powder, and 2) calcine the powder at different temperatures. In the present invention, high-energy density nanocomposite capacitor films can be based on the doped $BaTiO_3$ particles $((Ba_{0.9575}Nd_{0.0025}Ca_{0.04})[Ti_{0.815}Mn_{0.0025}Y_{0.18}]_{0.997}O_3)$ that have a dielectric constant around 33,000 at room temperature which is about ten times higher than conventional $BaTiO_3$ particles.

Doped barium titanate with the formula $Ba_{0.9575}Nd_{0.0025}Ca_{0.04})[Ti_{0.815}Mn_{0.0025}Y_{0.18}]_{0.997}O_3$ was produced by ball milling $BaCO_3$, $Nd_2O_3$, $CaCO_3$, $TiO_2$, $MnCO_3$, and $Y_2O_3$ for 24 hours. The mixed powder was then calcined at high temperature, such as 800° C. to 1300° C. (and all values therebetween). It is observed that different temperature calcining yields different crystal structure and particle size of doped materials. In this non-limiting composition, the nanocomposites with doped $BaTiO_3$ nanoparticles calcined at 900° C. have the highest dielectric permittivity. Other similar compositions will have a different optimum calcining temperature.

While this non-limiting example was directed to $BaTiO_3$, it is understood that other high dielectric materials can be chosen, doped, coated and activated for the same purpose. These materials include any selected ferroelectric materials such as lead zirconate titanate ($Pb(Zr_xTi_{1-x})O_3$), $Pb(Mg_{1/3}Nb_{2/3})O_3$—$PbTiO_3$ (PMN-PT), $BaTiO_3$ and so on, or any other high dielectric materials, for example, calcium copper titanate ($CaCu_3Ti_4O_{12}$). As defined herein, a high dielectric material has a dielectric constant (i.e., relative permittivity) at the frequency of 1 kHz at room temperature (e.g., 70° F.) of at least 100, typically at least 300, and more typically at least 500 (e.g., 100-100,000 and all values and ranges therebetween).

Assuming there is no loss, the energy density of the capacitor can be expressed by the following equation: $U=\kappa E^2/2$, where U is energy density, $\kappa$ is the dielectric permittivity and E is the dielectric breakdown strength. The energy density is a square relationship to the breakdown strength, while it is linear to the dielectric permittivity of the nanocomposite. However, while current nanocomposites improve the dielectric permittivity of the capacitor, the gains come at the expense of the breakdown strength, which limits the ultimate performance. One of the main reasons of this limitation is that these high dielectric permittivity fillers have low breakdown strength resulting in a low-energy density capacitor.

The invention is directed to improving the breakdown strength of the nanocomposite by creating gradient interfaces between the polymer material and the filler. First, the core-shell structure dielectric particle is designed. The shell materials typically have high dielectric permittivity, and the core materials are chosen from many that have exceptional high voltage breakdown (particularly in thin films) such as $Al_2O_3$, $SiO_2$, mica, diamond and so on. This core-shell structure not only provides high dielectric permittivity, but also improves the breakdown strength of the shell. Also, the shell structure can improve the high charge storage capability at the dielectric-dielectric interfaces. The thickness of the shell can range from 10 Å to 500 nm, and in some cases from 5 Å to 1000 nm (and all values therebetween).

Following the encapsulation, hierarchical particles are functionalized with different terminated groups to create the gradient interface between the polymer material and the filler. The gradient functional group not only improves the compatibility of the filler with the polymer material, but also improves the breakdowns strength of the nanocomposite. The terminated group can be any group to create the bond between the polymer material and filler, such as, but not limited to, amine group, hydroxyl group or others selected from phosphonate group, a silyl group, or a carboxylic group and others. The process for coating the one or more functional groups on the outer surface of the shell is non-limiting. Generally the thickness of the coating or layer of the one or more functional groups on the outer surface of the shell is about 1 Å to 200 nm.

By incorporating these hierarchical particles into a polymer material, the invention provides a novel method to prepare a high-energy density nanocomposite capacitor. The polymers can be selected from many dielectric films including polyvinylidene fluoride (PVDF), PVDF copolymers such as trifluoroethylene (P(VDF-TrFE)), hexafluoropropylene (P(VDF-HFP)) and chlorotrifluoroethylene (P(VDF-CTFE)) as well as terpolymers such as poly(vinylidene fluoride-trifluoroethylene-chlorofluoroethylene) (P(VDF-TrFE-CFE)), polytetrafluoroethylene (PTFE), polyimide (PI), Teflon™, polyethylene naphthalate (PEN), polypropylene (PP), polycarbonate (PC), polystyrene (PS), polyphenylene sulfide (PPS), polyether ether ketone (PEEK), polyethylenimine (PEI), polyarylsulfones (PSU), and others. The nanofillers can be dispersed into the polymer solution; the nanocomposite films can then be solution cast into films. It is understood by one skilled in the art that these films can be made by extrusion, blown film techniques, calendaring and other film preparation techniques. The films can then be heat treated to reach high breakdown strength and high dielectric permittivity to reach high-energy density.

The following example is directed to tape casting technology that provides a means for producing large quantities of thin film materials at a low cost. The system is easily scalable and ideal for processing material for capacitors, which require high-quantity, low-cost production.

EXAMPLES

Doped barium titanate with the formula $Ba_{0.9575}Nd_{0.0025}Ca_{0.04})[Ti_{0.815}Mn_{0.0025}Y_{0.18}]_{0.997}O_3$ was produced by ball milling $BaCO_3$, $Nd_2O_3$, $CaCO_3$, $TiO_2$, $MnCO_3$, and $Y_2O_3$ for 24 hours. Different calcining temperatures will yield different final structures of the powder, thereby leading to a change in the dielectric properties of the materials. FIG. 1 illustrates the XRD patterns of the samples calcined at different temperatures (900° C., 1000° C., 1050° C., and 1200° C.). As illustrated in FIG. 1, peaks corresponding to $BaTiO_3$ as well as peaks corresponding to other doped ceramic phases are illustrated. The peaks around 25 and 63 degrees suggest that there was some phase change after 1050° C. during the calcining process. This phase change was likely brought on by doping with many differently sized elements (Ca, Mn, Y and Nd). As illustrated in FIG. 1, there is a slightly different final structure for doped $BaTiO_3$ that was calcined at different temperatures.

Figure 2:
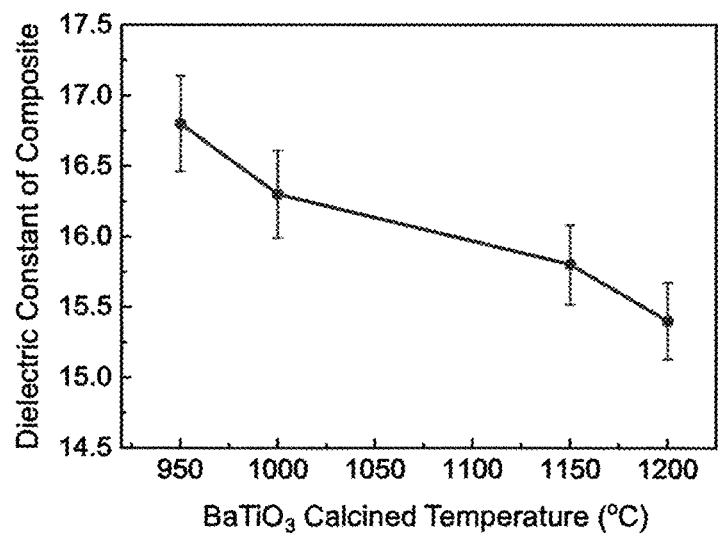
FIG. 2 illustrates the ability to control the dielectric constant of the nanocomposites by the incorporation of 7.5 vol % $BaTiO_3$ particles, which are calcined at different temperatures.

The temperatures (950° C., 1000° C., 1150° C. and 1200° C.) were used to illustrate the effect of the $BaTiO_3$ particles calcined at different temperatures on the dielectric and energy storage properties of the nanocomposites. FIG. 2 is a graph illustrating the dielectric constant of the nanocomposites with the incorporation of 7.5 vol % $BaTiO_3$ ceramic fillers, which are calcined at different temperatures (950° C., 1000° C., 1150° C. and 1200° C.). It is showed that the dielectric constant of the nanocomposite is influenced by the filler nanoparticles, which are calcined at different temperatures. By adjusting the structure and particle of the ceramic fillers in the polymer material, the dielectric constant of the composites can be tuned.

Figure 3:
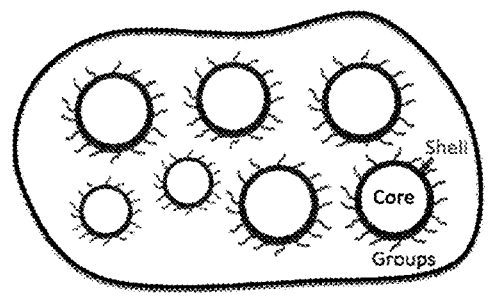
FIG. 3 illustrates modified nanoparticles creating a gradient interface between a filler and a polymer material to achieve high-energy density nanocomposite.

FIG. 3 schematically illustrates the hierarchical structure of ceramic fillers in the polymer material to create a high-energy density nanocomposite capacitor. More specially, high dielectric permittivity ceramic filler is designed as a core-shell structure. The core has a high dielectric permittivity, while the shell materials have high breakdown strength. In a representative example, particle cores occupy at least about 50% (e.g., 50-99% vol. % and all values and ranges therebetween) of the total of the volume in core-shell ceramic fillers; however, this is not required. Representative materials that can be used to form the core-shell structure can be any high dielectric permittivity materials (e.g., barium titanate, lead zirconium titanate, CCTO, etc.). The shell is a thin film with high breakdown strength materials to protect the high dielectric core structure. Representative materials can be any high-breakdown strength materials (e.g., $Al_2O_3$, $SiO_2$, mica, diamond and others). The particle cores can have a variety of shapes (e.g., spherical, elongated, or irregular), and a variety of sizes. The particle cores have a relatively small size, usually less than about 100 μm (e.g., 0.05-500 μm and all values and ranges therebetween), and the thickness of the film is generally between about 0.1 nm to 1 μm (and all values and ranges therebewteen).

Figure 4:
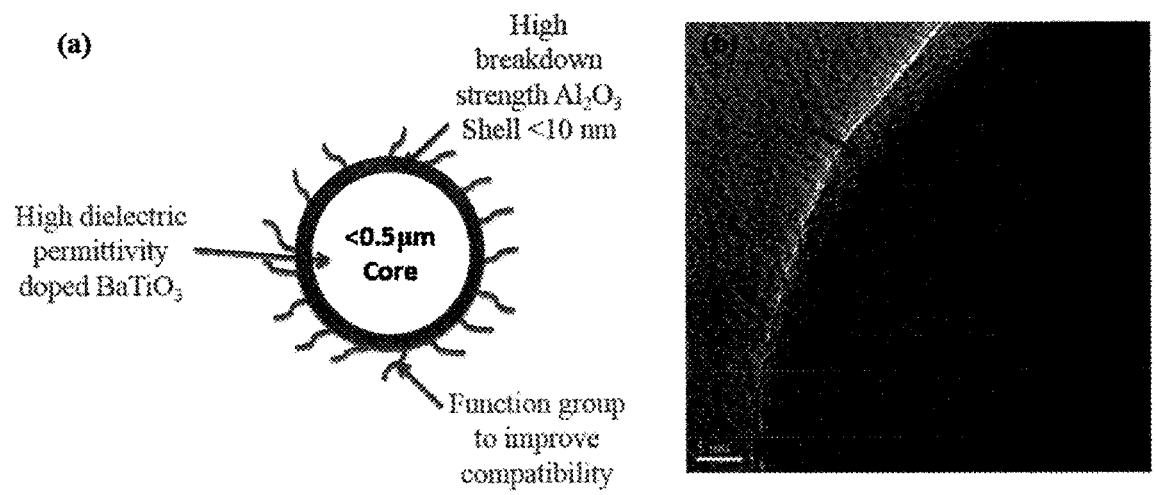
FIG. 4 illustrates the hierarchical structure of (a) a TEM picture; and (b) a doped $BaTiO_3$ nanoparticle developed for ultra-high-energy density nanocomposite capacitors.

FIG. 4 illustrates an example to create a gradient interface between the filler and polymer material, as well as a core-shell structure nanoparticle. The nano-engineered particle designed for the nano-laminated dielectric particle is illustrated in FIG. 4a. In this non-limiting example, high dielectric permittivity doped $BaTiO_3$ nanoparticles with around 100 nm were chosen as core materials. The coating materials have exceptional high voltage breakdown (particularly in thin films), as well as providing for high-charge storage at the dielectric-dielectric interfaces. The sol-gel process uses an ultrasonic horn to disperse $BaTiO_3$ in anhydrous ethanol, a solution of aluminum isopropoxide in anhydrous ethanol was then added to the $BaTiO_3$ dispersion, and was again blended ultrasonically to fully disperse and coat the particles. This step was followed by the addition of deionized water to the mixture. The aluminum isopropoxide, which clings to the surface of the BaTiO$_3$, undergoes a hydrolysis reaction and leaves aluminum oxide on the surface of the particles. The particles were then dried in air and calcined to densify the Al$_2$O$_3$ surface coating. This method successfully coated the doped barium titanate with 10 nm Al$_2$O$_3$ film observed in high-resolution transmission electron microscopy (HRTEM), as shown on the FIG. 4b.

Figure 5:
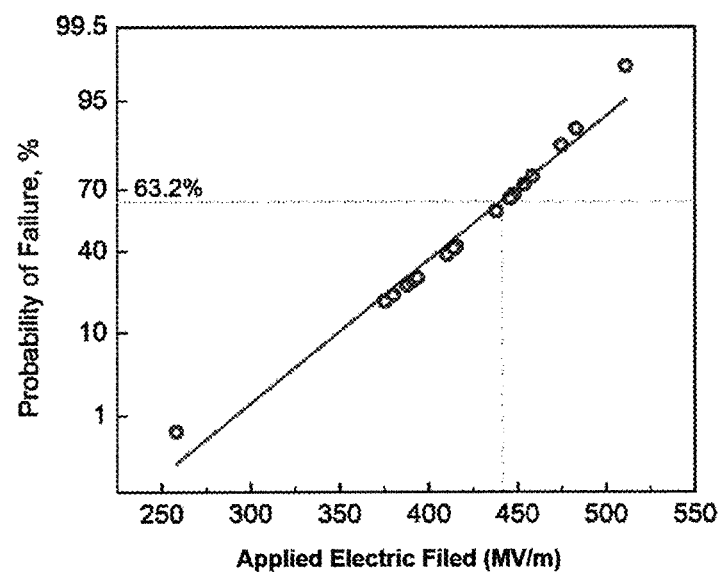
FIG. 5 illustrates a Weibull distribution of the observed dielectric breakdown strength of a dielectric nanocomposite film including doped nanoparticles with gradient interface; and, FIG. 6 illustrates the energy density (19.6 J/cc) calculated from typical D-E loop of nanocomposites dielectric nanocomposite film (a); and red arrows illustrating how the nanocomposite films failed under high electric field (b).

In order to prepare high-energy nanocomposite films, these nanoparticles can be dispersed in the dimethylformamide (DMF)/polyvinylidene fluoride (PVDF) solution by high-power horn solicitation. The entire process developed by this invention (encapsulation, surface function, high-power horn dispersion) stabilizes the particles in the solution for about one week, and sometimes more. Nanocomposite films were cast by using a solution casting method. The breakdown strength was measured by using an electrostatic pull-down method with Weibull distribution analysis as shown in FIG. 5. Pull-down between the conductive substrate and a brass dome typically occurs at an electrical field of 10 MV/m and is maintained until breakdown occurs over the test area. The pull-down method was chosen over a point-contact method to avoid any mechanical force that might cause premature breakdown at the contact point. Breakdown testing was performed in silicon oil to avoid electric arcing and was performed using a high voltage supply by sweeping the applied voltage until sample failure, as evidenced by spurious current changes. Every sample was tested for at least 15 data points. Dielectric breakdown strength was then extracted from a fit using Weibull failure statistics across at least 15 tests per sample. Following the procedure developed in this invention, the dielectric strength of the nanocomposites can reach 442 MV/m. It should be noticed that the breakdown strength of the nanocomposites reported here is much higher than that of any composites reported in current literature.

Figure 6:
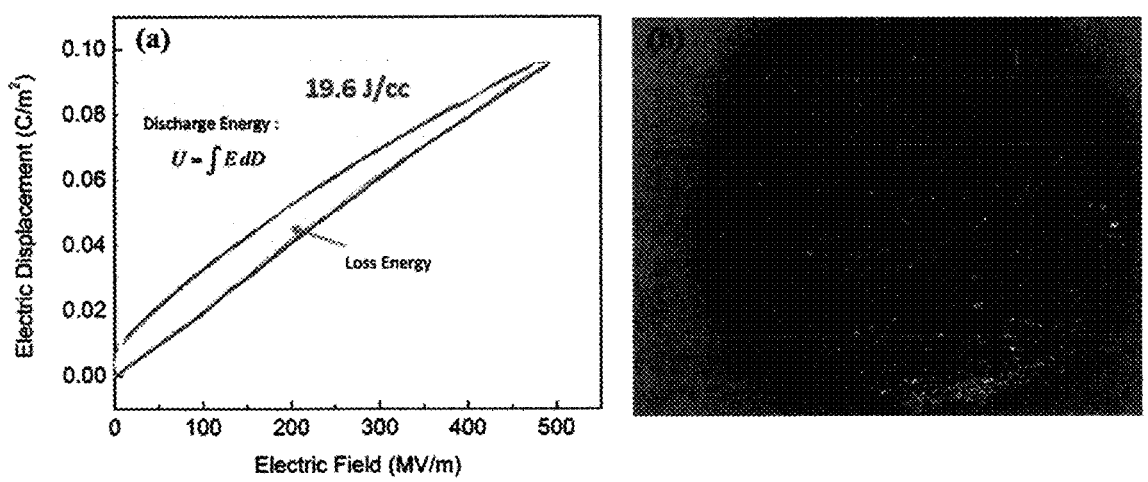

Energy density is identified through the measurement of the discharge energy from the sample when subjected to a unipolar electric field. The electric displacement-electric field (D-E) loops of the capacitor were measured using a Sawyer-Tower circuit, which allowed for the direct computation of the energy density $U = \int EdD$ (illustrated in FIG. 6a). The polarization loop was measured with increasing electric field until breakdown occurred and the maximum energy could be recorded. The graph on the left side of FIG. 6 shows the typical D-E loops of the nanocomposite films. From the graph, it can be calculated that the nanocomposite film can achieve an energy density 19.6 J/cc. FIG. 6b also demonstrates the self-healing ability of the metalized nanocomposite film. Under a high electric field, the current vaporizes the thin electrodes on the films in the immediate vicinity of the current flow (red arrow). This means that the local breakdown of the film nanocomposite will not influence the work status of the capacitor, and will help to greatly extend the life of the capacitor and the equipment in which it is installed.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A method for forming a composite film comprising:
    a. forming a plurality of particles of high dielectric permittivity ceramic filler, said high dielectric permittivity ceramic filler having a core-shell structure, a core of said core-shell structure having a different composition than a shell of said core-shell structure, said core includes ceramic material that includes two or more materials selected from the group consisting of barium, calcium, copper, lead, magnesium, strontium, niobium, titanium, and zirconium, said shell formed of one or more materials selected from the group consisting of Al$_2$O$_3$, SiO$_2$, Si$_3$N$_4$, MgO, aluminosilicate, mica, and carbon, said shell forming a calcined shell about said core, wherein 1) at least one portion of said high dielectric permittivity ceramic filler being formed of cores that have been sintered at a first temperature and another portion of said high dielectric permittivity ceramic filler being formed of cores that have been sintered at a second temperature, and wherein said first and second temperatures are different temperatures, and/or 2) at least one portion of said high dielectric permittivity ceramic filler being formed of cores wherein said ceramic material has been doped to include one or more elements selected from the group consisting of Nd, Ca, Mn, and/or Y;
    b. dispersing a plurality of said particles of said high dielectric permittivity ceramic filler having one or more functional groups into a polymer material; and,
    c. solution casting said polymer material having said plurality of said coated particles of said high dielectric permittivity ceramic filler into a film to form said composite film.

2. The method as defined in claim 1, wherein said polymer material includes polar groups.

3. The method as defined in claim 1, wherein said shell is a dielectric material that has a breakdown strength that is at least three times that of said material used to form said core.

4. The method as defined in claim 1, wherein said particles of said high dielectric permittivity ceramic filler have a particle size of less than 1 micron.

5. The method as defined in claim 1, wherein said particles of said high dielectric permittivity ceramic filler have a particle size of about 10 nanometer to less than about 1 μm.

6. The method as defined in claim 1, wherein said particles of said high dielectric permittivity ceramic filler have a particle size of about 50-450 nanometers.

7. The method as defined in claim 1, wherein said particles of said high dielectric permittivity ceramic filler have a particle size of less than about 200 nanometers.

8. The method as defined in claim 1, wherein said shell has a coating thickness of at least about 10 Å and less than 1 μm.

9. The method as defined in claim 1, wherein said shell has a coating thickness of less than 20 nanometer.

10. The method as defined in claim 1, wherein said core of said high dielectric permittivity ceramic filler includes a high dielectric material, said shell includes a high breakdown strength material, said core is at least partially encapsulated by said shell.

11. The method as defined in claim 10, wherein said core includes one or more materials selected from the group consisting of $BaTiO_3$, $(Pb(Zr_xTi_{1-x})O_3)$, $Pb(Mg_{1/3}Nb_{2/3})O_3$—$PbTiO_3$, $CaCu_3Ti_4O_{12}$, $TiO_2$, $BaSrTiO_3$, and $Ba_{0.8}Pb_{0.2}(Zr_{0.12}Ti_{0.88})O_3$.

12. The method as defined in claim 1, wherein said core includes doped $BaTiO_3$ or $BaSrTiO_3$ and said shell includes one or more compounds selected form the group consisting of $Al_2O_3$, $MgO$ and $SiO_2$, and wherein said core includes one or more doped elements selected from the group consisting of Nd, Ca, Mn, and/or Y.

13. The method as defined in claim 1, wherein said thickness of said shell is less than said particle size of said core.

14. The method as defined in claim 1, wherein said composite film has a greater dielectric constant than a dielectric constant of said polymer material and any polymer included in said polymer material that is used to form said composite film, said composite film has a greater breakdown strength than a breakdown strength of any of said high dielectric permittivity ceramic filler in said composite film.

15. The method as defined in claim 1, wherein at least one portion of said high dielectric permittivity ceramic filler is formed of cores having a) particles that have been calcined at said first temperature, and/or b) said first composition, and another portion of said high dielectric permittivity ceramic filler is formed of cores having a) particles that have been calcined at a second temperature, and/or b) said second composition.

16. The method as defined in claim 1, wherein a dielectric performance, dielectric permeability, energy storage performance, and combinations thereof of said composite film is achieved by adjusting a crystal structure, a particle size, or combinations thereof of said high dielectric permittivity ceramic filler, said adjusting of said crystal structure, a particle size, or combinations thereof is achieved by a) calcining a plurality of said high dielectric permittivity ceramic filler at different temperatures for inclusion in said polymer material, b) incorporating different composition high dielectric permittivity ceramic filler in said polymer material, c) incorporating a plurality of different particle sizes of said high dielectric permittivity ceramic filler in said polymer material, and any combination of a), b), and c).

17. The method as defined in claim 1, wherein said polymer material includes one or more compounds selected from the group consisting of polyvinylidene fluoride (PVDF), PVDF copolymers such as trifluoroethylene (P(VDF-TrFE)), hexafluoropropylene (P(VDF-HFP)) and chlorotrifluoroethylene (P(VDF-CTFE)) as well as terpolymers such as poly(vinylidene fluoride-trifluoroethylene-chlorofluoroethylene) (P(VDF-TrFE-CFE)), polytetrafluoroethylene (PTFE), polyimide (PI), Teflon™, polyethylene naphthalate (PEN), polypropylene (PP), polycarbonate (PC), polystyrene (PS), polyphenylene sulfide (PPS), polyether ether ketone (PEEK), polyethylenimine (PEI), and polyarylsulfones (PSU).

18. The method as defined in claim 1, wherein one or more of said particles of said high dielectric permittivity ceramic filler in said polymer material has a greater relative permittivity than said polymer material.

19. The method as defined in claim 1, wherein all of said particles of said high dielectric permittivity ceramic filler in said polymer material has a greater relative permittivity than said polymer material.

20. The method as defined in claim 1, wherein said polymer material has a greater breakdown strength than one or more of said particles of said high dielectric permittivity ceramic filler in said polymer material.

21. The method as defined in claim 1, wherein said polymer material has a greater breakdown strength than any of said particles of said high dielectric permittivity ceramic filler in said polymer material.

22. The method as defined in claim 1, wherein said composite film has a dielectric constant of at least 150% a dielectric constant of any polymer in said polymer material.

23. The method as defined in claim 1, wherein said high dielectric permittivity ceramic filler comprises about 1 vol. % to 95 vol. % of said composite film.

24. The method as defined in claim 1, wherein said high dielectric permittivity ceramic filler comprises about 5-25 vol. % of said composite film.

25. The method as defined in claim 1, wherein said core of said high dielectric permittivity ceramic filler is calcined at a temperature of about 800° C. to about 1300° C. prior to applying said shell to said core.

26. The method as defined in claim 1, further including the step of post-heat treating said calcined core, said step of post-heat treating includes one or more processes selected from the group consisting of quench in water, quench in ice water, quench in liquid nitrogen, and heat above melting point.

27. The method as defined in claim 1, wherein said step of post-heat treating said calcined core is used to improve breakdown strength of said high dielectric permittivity ceramic filler, achieve higher energy density of said high dielectric permittivity ceramic filler, or combinations thereof.

28. The method as defined in claim 1, further including the step of stretching or aligning said composite film to achieve higher energy density of said composite film, said step of stretching or aligning includes one or more processes selected from the group consisting of uniaxial stretching, and biaxial stretching.

29. The method as defined in claim 1, wherein a thickness of said composite film is at least about 1 μm.

30. The method as defined in claim 1, wherein a thickness of said composite film is about 1 μm to 1 mm.

31. The method as defined in claim 1, wherein said composite film is included in a device or component selected from the group consisting of power pulse devices, energy storage devices, inverters, converters, motors, DC bus capacitors, and high-power lighting.

32. The method as defined in claim 1, wherein said composite film is included in a device or component selected from the group consisting of radar devices, lasers, rail guns, high-power microwave devices, defibrillators, and pacemakers.

33. A method for forming a composite film for use in a capacitor comprising:
   a. providing a plurality of particles of high dielectric permittivity ceramic filler, said high dielectric permittivity ceramic filler having a core-shell structure, a core of said core-shell structure having a different composition than a shell of said core-shell structure, said shell heated after being calcined on said core, said core includes ceramic material that includes two or more materials selected from the group consisting of barium, calcium, copper, lead, magnesium, strontium, titanium, and zirconium, and one or more materials selected from the group consisting of Nd, Ca, Mn, and/or Y, said shell formed of one or more materials selected from the group consisting of $Al_2O_3$, $SiO_2$, $Si_3N_4$, MgO, aluminosilicate, mica, and carbon, said shell forming a calcined shell about said core, wherein different particles of high dielectric permittivity ceramic filler have cores that have been sintered at different temperatures to create different structures and particle sizes;

b. dispersing a plurality of said particles of said high dielectric permittivity ceramic filler having said one or more functional groups into a polymer material; and, c. solution casting said polymer material having said plurality of said coated particles of said high dielectric permittivity ceramic filler into a film to form said composite film.

34. The method as defined in claim 33, wherein said core of said high dielectric permittivity ceramic filler includes a high dielectric material, said shell includes a high breakdown strength material, said core is at least partially encapsulated by said shell, said high dielectric material includes one or more materials selected from the group consisting of $BaTiO_3$, $(Pb(Zr_xTi_{1-x})O_3)$, $Pb(Mg_{1/3}Nb_{2/3})O_3$—$PbTiO_3$, $CaCu_3Ti_4O_{12}$, $TiO_2$, $BaSrTiO_3$, and $Ba_{0.8}Pb_{0.2}(Zr_{0.12}Ti_{0.88})O_3$.

35. The method as defined in claim 33, wherein said shell includes one or more materials selected from the group consisting of $Al_2O_3$, $SiO_2$, $Si_3N_4$, MgO, aluminosilicates, mica, and diamond.

36. The method as defined in claim 34, wherein said shell includes one or more materials selected from the group consisting of $Al_2O_3$, $SiO_2$, $Si_3N_4$, MgO, aluminosilicates, mica, and diamond.

37. The method as defined in claim 33, wherein said polymer material includes one or more compounds selected from the group consisting of polyvinylidene fluoride (PVDF), PVDF copolymers such as trifluoroethylene (P(VDF-TrFE)), hexafluoropropylene (P(VDF-HFP)) and chlorotrifluoroethylene (P(VDF-CTFE)) as well as terpolymers such as poly(vinylidene fluoride-trifluoroethylene-chlorofluoroethylene) (P(VDF-TrFE-CFE)), polytetrafluoroethylene (PTFE), polyimide (PI), Teflon™, polyethylene naphthalate (PEN), polypropylene (PP), polycarbonate (PC), polystyrene (PS), polyphenylene sulfide (PPS), polyether ether ketone (PEEK), polyethylenimine (PEI), and polyarylsulfones (PSU).

38. The method as defined in claim 36, wherein said polymer material includes one or more compounds selected from the group consisting of polyvinylidene fluoride (PVDF), PVDF copolymers such as trifluoroethylene (P(VDF-TrFE)), hexafluoropropylene (P(VDF-HFP)) and chlorotrifluoroethylene (P(VDF-CTFE)) as well as terpolymers such as poly(vinylidene fluoride-trifluoroethylene-chlorofluoroethylene) (P(VDF-TrFE-CFE)), polytetrafluoroethylene (PTFE), polyimide (PI), Teflon™, polyethylene naphthalate (PEN), polypropylene (PP), polycarbonate (PC), polystyrene (PS), polyphenylene sulfide (PPS), polyether ether ketone (PEEK), polyethylenimine (PEI), and polyarylsulfones (PSU).

39. The method as defined in claim 33, further including the step of applying one or more functional groups to an outer surface of said particles of said high dielectric permittivity ceramic filler, said one or more functional groups includes one or more compounds selected from the group consisting of an amine group, a hydroxyl group, a phosphonate group, a silyl group, and a carboxylic group, said functional groups creating a gradient interface between said core and said polymer that improves compatibility of said high dielectric permittivity ceramic filler with said polymer material and also creates a gradient interface between said high dielectric permittivity ceramic filler and said polymer to attain a high permittivity while maintaining a high breakdown strength leading to high-energy density.

40. The method as defined in claim 36, further including the step of applying one or more functional groups to an outer surface of said particles of said high dielectric permittivity ceramic filler, said one or more functional groups includes one or more compounds selected from the group consisting of an amine group, a hydroxyl group, a phosphonate group, a silyl group, and a carboxylic group, said functional groups creating a gradient interface between said core and said polymer that improves compatibility of said high dielectric permittivity ceramic filler with said polymer material and also creates a gradient interface between said high dielectric permittivity ceramic filler and said polymer to attain a high permittivity while maintaining a high breakdown strength leading to high-energy density.

41. The method as defined in claim 33, wherein at least one portion of said high dielectric permittivity ceramic filler being formed of cores having a first composition and another portion of said high dielectric permittivity ceramic filler being formed of cores having a second composition, and wherein the first and second compositions are different compositions.

42. The method as defined in claim 40, wherein at least one portion of said high dielectric permittivity ceramic filler being formed of cores having a first composition and another portion of said high dielectric permittivity ceramic filler being formed of cores having a second composition, and wherein the first and second compositions are different compositions.

43. The method as defined in claim 33, wherein at least one portion of said high dielectric permittivity ceramic filler being formed of cores that have been sintered at a first temperature and another portion of said high dielectric permittivity ceramic filler being formed of cores that have been sintered at a second temperature, and wherein said first and second temperatures are different temperatures.

44. The method as defined in claim 37, wherein at least one portion of said high dielectric permittivity ceramic filler being formed of cores that have been sintered at a first temperature and another portion of said high dielectric permittivity ceramic filler being formed of cores that have been sintered at a second temperature, and wherein said first and second temperatures are different temperatures.

45. A method for forming a composite film for use in a capacitor comprising:

a. providing a plurality of particles of high dielectric permittivity ceramic filler, said high dielectric permittivity ceramic filler having a core-shell structure, a core of said core-shell structure having a different composition than a shell of said core-shell structure, said shell heated after being calcined on said core, said core includes ceramic material that includes two or more materials selected from the group consisting of barium, calcium, copper, lead, magnesium, strontium, titanium, and zirconium, said shell formed of one or more materials selected from the group consisting of $Al_2O_3$, $SiO_2$, $Si_3N_4$, MgO, aluminosilicate, mica, and carbon, said shell forming a calcined shell about said core, wherein 1) at least one portion of said high dielectric permittivity ceramic filler being formed of cores that have been sintered at a first temperature and another portion of said high dielectric permittivity ceramic filler being formed of cores that have been sintered at a second temperature, and wherein said first and second temperatures are different temperatures, 2) at least one portion of said high dielectric permittivity ceramic filler being formed of cores having a first particle size and another portion of said high dielectric permittivity ceramic filler being formed of cores having a second particle size, and wherein the first and second particle sizes are different, and/or 3) at least one portion of said high dielectric permittivity ceramic filler being formed of cores wherein said ceramic material has been doped to include one or more elements selected from the group consisting of Nd, Ca, Mn, and/or Y;

b. dispersing a plurality of said particles of said high dielectric permittivity ceramic filler having said one or more functional groups into a polymer material; and, c. solution casting said polymer material having said plurality of said coated particles of said high dielectric permittivity ceramic filler into a film to form said composite film.

46. The method as defined in claim 45, wherein at least one portion of said high dielectric permittivity ceramic filler being formed of cores having a first composition and another portion of said high dielectric permittivity ceramic filler being formed of cores having a second composition, and wherein the first and second compositions are different compositions.

47. The method as defined in claim 45, wherein at least one portion of said high dielectric permittivity ceramic filler being formed of cores that have been sintered at said first temperature and another portion of said high dielectric permittivity ceramic filler being formed of cores that have been sintered at said second temperature.

48. The method as defined in claim 45, wherein at least one portion of said high dielectric permittivity ceramic filler being formed of cores that have said first particle size and another portion of said high dielectric permittivity ceramic filler being formed of cores having said second particle size.

49. The method as defined in claim 45, wherein said core includes $BaTiO_3$ that has been doped to include one or more doped elements selected from the group consisting of Nd, Ca, Mn, and/or Y.

* * * * *